United States Patent
Grabarnik et al.

(10) Patent No.: US 8,782,529 B2
(45) Date of Patent: Jul. 15, 2014

(54) SYSTEM AND METHOD FOR OFFERING MULTIPLE REPRESENTATIONS OF AN IPC TICKET

(75) Inventors: Genady Grabarnik, Scarsdale, NY (US); Jonathan Lenchner, North Salem, NY (US); Larisa Shwartz, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 1232 days.

(21) Appl. No.: 12/165,906

(22) Filed: Jul. 1, 2008

(65) Prior Publication Data

US 2010/0005384 A1    Jan. 7, 2010

(51) Int. Cl.
*G06F 3/00* (2006.01)
*G06F 15/177* (2006.01)

(52) U.S. Cl.
USPC .......................................... 715/744; 715/736

(58) Field of Classification Search
USPC ............. 704/48; 709/223; 715/733, 736, 744, 715/745
See application file for complete search history.

(56) References Cited

U.S. PATENT DOCUMENTS

| | | | |
|---|---|---|---|
| 6,594,640 B1 | 7/2003 | Postrel | |
| 6,957,257 B1 * | 10/2005 | Buffalo et al. | 709/224 |
| 7,156,294 B2 | 1/2007 | Roth | |
| 7,370,045 B2 * | 5/2008 | Vora et al. | 717/106 |
| 7,493,325 B1 * | 2/2009 | Bhatnagar et al. | 1/1 |
| 7,747,738 B2 * | 6/2010 | Ellisor, Jr. | 709/224 |
| 7,870,491 B1 * | 1/2011 | Henderson et al. | 715/745 |
| 7,900,152 B2 * | 3/2011 | Nielsen et al. | 715/764 |
| 2003/0069797 A1 * | 4/2003 | Harrison | 705/26 |
| 2004/0044554 A1 * | 3/2004 | Bull et al. | 705/8 |
| 2004/0083113 A1 | 4/2004 | Cao et al. | |
| 2004/0111313 A1 * | 6/2004 | Ingman et al. | 705/9 |
| 2006/0112340 A1 * | 5/2006 | Mohr et al. | 715/733 |
| 2007/0012765 A1 | 1/2007 | Trinquet et al. | |
| 2007/0299953 A1 * | 12/2007 | Walker et al. | 709/223 |
| 2008/0155564 A1 * | 6/2008 | Shcherbina et al. | 719/318 |
| 2008/0172574 A1 * | 7/2008 | Fisher | 714/25 |
| 2008/0243921 A1 * | 10/2008 | Ellisor | 707/104.1 |
| 2009/0276728 A1 * | 11/2009 | Doan et al. | 715/810 |

OTHER PUBLICATIONS

Baldwin; Applying Multiple Views to Information Systems: A Preliminary Framework; Data Base; Nov. 1993; pp. 15-30.
Kim et al.; Ticket-based Fine-Grained Authorization Service in the Dynamic VO Environment; ACM Workshop on Secure Web Services; Oct. 29, 2004, Fairfax, VA; pp. 29-36.
Krishna et al.; Towards Smarter Documents; CIKM'04; Nov. 8-13, 2004 Washington, DC; 2004; pp. 634-641.
Matsuyama et al.; Distributed Digital-Ticket Management for Rights Trading System; E-Commerce 99; Denver, CO; 1999; pp. 110-118.
Van De Kar et al.; Mobile Services Used in Unstable Environments: Design Requirements Based on Three Case Studies; ICE'06; Aug. 14-16, 2006; Fredericton, Canada; 2006; pp. 302-308.

* cited by examiner

*Primary Examiner* — Rashawn Tillery
(74) *Attorney, Agent, or Firm* — Tutunjian & Bitetto, P.C.; Louis Percello

(57) ABSTRACT

A system and method for rendering different views of an incident, problem or change (IPC) ticket relating to an incident based on attributes of the user looking at or working with the ticket includes determining relevant information. An environment related to a usage by the user is determined. Based upon the relevant information and the environment, an IPC ticket is generated with different views where only a relevant view of the different views is provided to each particular user.

20 Claims, 2 Drawing Sheets

SYSTEM AND METHOD FOR OFFERING MULTIPLE REPRESENTATIONS OF AN IPC TICKET

BACKGROUND

1. Technical Field

Figure 1:
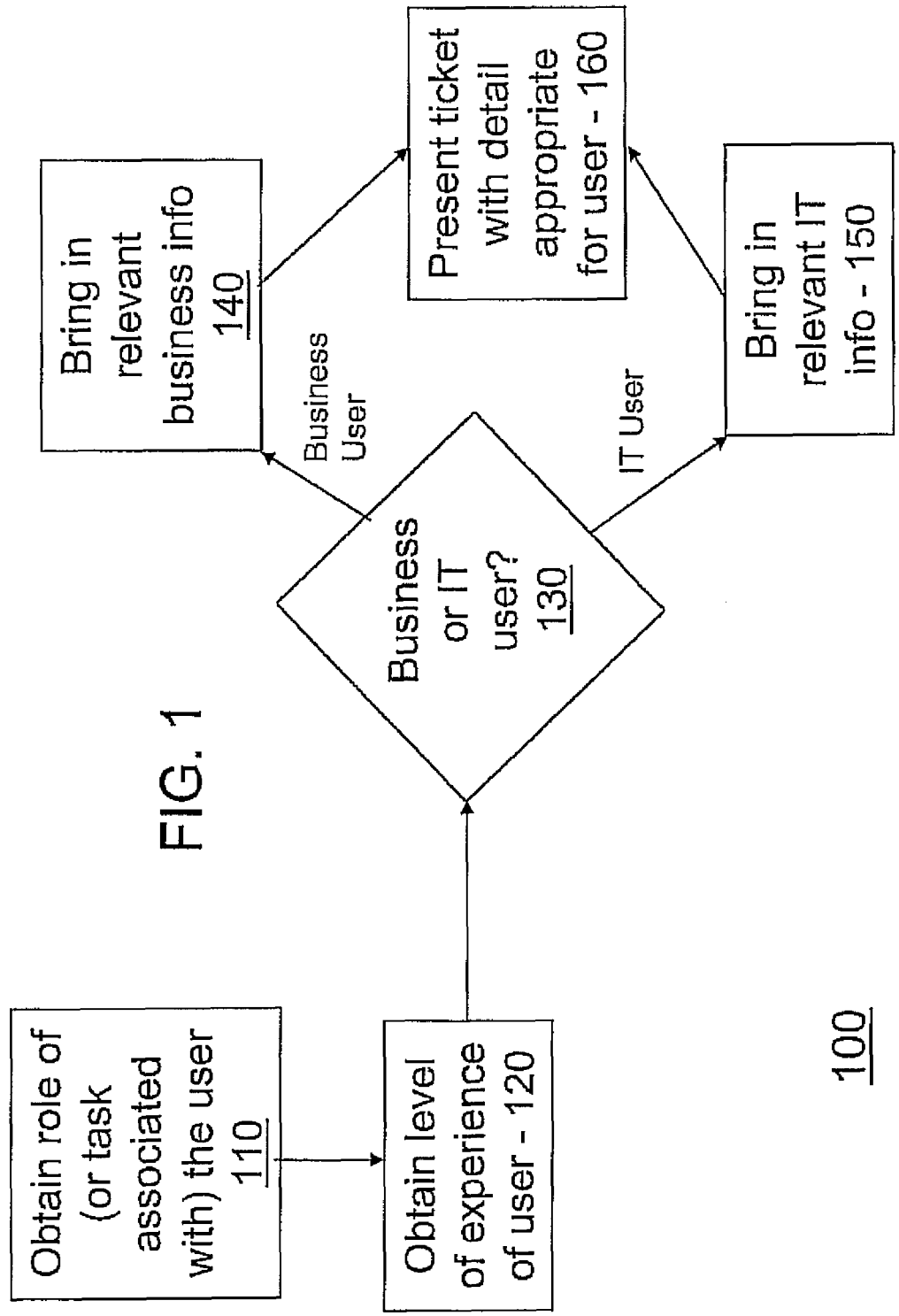

The present invention relates to incident, problem and change (IPC) ticketing in processing systems and more particularly to IPC ticketing for use in the course of delivering information technology services where services may include server support, end user desktop support, specific application support, etc.

2. Description of the Related Art

Users working with incident, problem or change (IPC) tickets in today's help centers or data centers are typically presented with an entire ticket, regardless of their experience level, role, or task. However, tickets are often cluttered with information which are either inappropriate for the experience level of the person handling the ticket, inappropriate for the role of the person handling the ticket, or inapplicable to a particular task being carried out by a ticket handler.

IPC tickets are tickets generated by an information technology system, for example, in a server based service environment. The ticket is generated to provide an audit trail for any occurrences in the system. The ticket is formatted and may be sent electronically or provided in paper form to any of a plurality of administrative personnel.

SUMMARY

It would be advantageous if an approver of a change ticket could see only details pertinent to what they are being asked to approve. An inexperienced ticket handler or someone charged with dispatching tickets should just see an abstract of the ticket. A network administrator should see information on the ticket (or automatically inferred from the ticket) pertaining just to his/her role, e.g., in this case just to network components. The time and efficiency of a ticket handler is extremely valuable. Saving minutes or even seconds of efficiency on every ticket can translate into millions of dollars worth of annual savings for a company handling huge volumes of tickets each day.

A system and method for presenting an incident, problem or change (IPC) ticket to a user with details which are most useful to the user is provided by virtue of automatically understanding the task or role that the user is performing, or otherwise by virtue of knowing something about the user and their information needs. A ticket is presented at a level of detail most suitable for the user who is currently working with the tickets, or most suitable to the task at hand, if the task can be identified or elicited from the user.

A system and method disclosed provides for the rendering of different views of an incident, problem or change (IPC) ticket relating to an incident based on attributes of the user looking at or working with the ticket includes determining relevant information including at least one of a role of a user, experience level of the user and a task. An environment related to a usage by the user is determined, together with the user's role and task. Based upon this relevant information and the usage environment, an IPC ticket is presented with a relevant view geared to the particular user, and one or more of his role, task and usage environment.

These and other features and advantages will become apparent from the following detailed description of illustrative embodiments thereof, which is to be read in connection with the accompanying drawings.

BRIEF DESCRIPTION Or DRAWINGS

Figure 2:
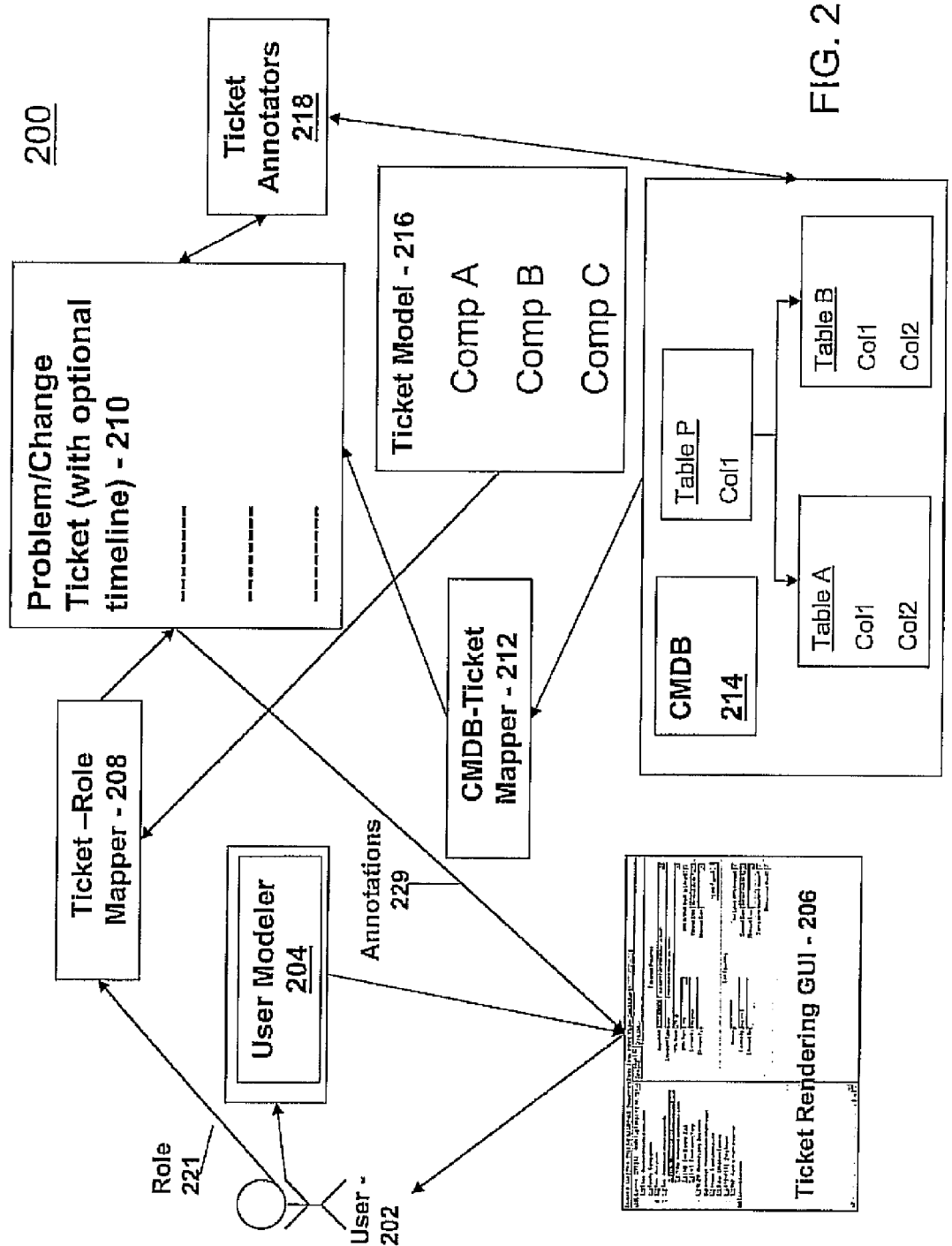

The disclosure will provide details in the following description of preferred embodiments with reference to the following figures wherein:

FIG. 1 is a block/flow diagram of a system/method for ascertaining or collecting various properties of a user and then displaying a ticket in appropriate detail based on the collected user properties; and FIG. 2 is a block/flow diagram of a system/method for rendering different views of an incident, problem or change ("IPC") ticket relating to an incident based on attributes of the user looking at or working with the ticket.

DETAILED DESCRIPTION OF PREFERRED EMBODIMENTS

In accordance with the present principles, an incident, problem and change (IPC) ticket is customized with precise details and, provided at a level of detail most suitable for the user who is currently working with the ticket, or most suitable to the user's task at hand, if the task can be identified from the workflow, or elicited from the user. Less sophisticated users are provided less sophisticated views (or more sophisticated views upon request), and more sophisticated users are provided more sophisticated views (or less sophisticated views upon request). The system uses automatic methods to detect the level of sophistication of the user. In one useful embodiment, the level of sophistication of the user can be gleaned by the terms used by the user in handling their historical tickets against the words used in a current ticket.

In one embodiment, criteria that affect what view of a ticket a user sees may include the following: the role of the user, the task the user is undertaking, the user's overall level of experience, the user's level of expertise in handling tickets of the given type, and the user entity type or environment (e.g., whether the user is a business or information technology (IT) user). Other criteria may also be employed.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a block/flow diagram of a system 100 which provides a customized IPC ticket is illustratively shown. The system 100 ascertains or collects various properties of the user and then displays the ticket in appropriate detail based on the collected user properties. The system 100 may be stored on a server or computer or distributed over many servers or computers. In one embodiment, the system 100 is provided in a help center or other center of operations for a distributed network system. The network system may provide customers or users with various IT services or may be a designated center for service for a single user or group of users.

In block 110, the system 100 obtains a role of, or task associated with, a user. This information may be obtained either from a workflow in which the system 100 is embedded, system knowledge of the user and a user's login attributes, or even by a direct query of the user. In block 120, the system 100 obtains a level of experience of the user. Level of experience may be known a priori by the system, for example, by looking up in a database the number of years of experience the user has. Experience may also be determined with respect to the ticket on hand (i.e., the current ticket). The level of experience, this time with respect to the current ticket, may be known a priori to the system as well. For example, in the context of a call center, call takers often declare their areas of expertise to the system 100, in advance. However, the system 100 can also deduce a level of experience in a given area, or, with respect to a given ticket, look at the text appearing on tickets the given user has successfully handled in the past to infer a level of experience.

A decision point is reached in block 130, and the flow bifurcates based on environment or application, for example, a decision of whether the user is an information technology (IT) user or a business user. If the user is a business user, block 140 is executed and business information relevant to the ticket is sought out and incorporated. Sample business information may include service level agreements (SLAs) which pertain to the ticket, or business processes impacted by the ticket.

On the other hand, if the user is an IT user, block 150 is executed, and IT information relevant to the ticket is incorporated. Sample IT information relevant to a ticket may come, for example, from a configuration management database (CMDB), monitoring devices, or even from other tickets. IT information may include information related to mentioned IT components such as servers, applications, or networking devices. The relationship amongst such components (sometimes referred to as "CIs"—or configurable items) is often found in a CMDB.

Regardless of which branch is taken, the business-user branch (block 140) or the IT-user branch (block 150), block 160 presents a ticket to the user in a level of detail appropriate for the particular user or the user's current task. For example, a person charged with dispatching tickets to an appropriate queue would, by default, be shown just an abstract of the ticket (with the abstract either manually added to the ticket as part of the normal process of opening a ticket, or obtained using automatic text summarization). An operating system (OS) level system administrator may just be shown OS-level details of a ticket, while a network administrator, looking at the same ticket may just be shown networking details, and an application support person, details phrased in terms of the application and its working environment. More sophisticated users would be shown, by default, more technical details, while less sophisticated users would be shown, by default, the ticket described at a higher level of abstraction.

Referring to FIG. 2, a system/method 200 for rendering different views of an incident, problem or change ("IPC") ticket relating to an incident based on attributes of the user looking at or working with the ticket. The system 200 includes a number of interacting components each described below.

A user modeler 204 employs a historical record of user interactions with a ticketing system to assess areas of expertise of a user 202. The user modeler 204 also incorporates time worked (employee's time in this particular job or role) and job responsibilities information as gleaned from an employee directory or other directories of stored information to create a model of the user 202. The user model created by the user modeler 204 is one of the components used to render a custom view of a ticket through the ticket rendering GUI 206 back to the user 202.

Ticket annotators 218 are run over tickets 210 as the tickets 210 are created, and then incrementally added to by different users of the system. Annotators 218 recognize mentions of: servers, applications, middleware, networking symptoms, causes, as well as provide text summarization. The annotators 218 identify aspects of the tickets 210, for example, that the ticket is relevant to networking, to the operating system layer, to the application layer, and so on, that may be so-indicated by the text of the ticket, for example in a problem description. This is accomplished with the help from a Configuration Management Database (CMDB) 214 (i.e. by looking up information in the CMDB 214 and possibly holding the universe of all possible values of a given annotation type in a hash table (e.g., table P)). Table P may include a hierarchically arranged hash table with sub-table A and B including information about an annotation type to be employed in a CMDB-ticket mapper 212 and/or annotators 218.

The annotator 218 adds a mark-up (e.g., xml) to the text to identify that a particular word or phrase, say, refers to a server, or suggests a possible symptom or root cause. Annotators 218 can also maintain their annotations apart from the text itself. Some annotators, do not mark up the text per se, but create something from the text. For example, the annotators 218 can also perform automatic ticket summarization, acronym expansion and definition lookup for key terms and phrases. Annotators 218 can be incorporated to identify symptoms, causes, user actions, diagnosis actions, etc.

A ticket model 216 is a component-based model of a ticket (e.g., component A, B, C. etc.). For example, the ticket model 216 for a problem ticket 210 may include as components a summary/abstract, causes, symptoms, user actions, diagnostic actions, root cause analysis and so on. In the FIG. 2, ticket model 216, Comp A, Comp B, and so forth, refer to various components of the relevant ticket model. Distinct models may exist for problem and change tickets. Ultimately each component of the ticket model 216 is broken down into "atomic" components—or components which are not/cannot be further broken down.

Given the ticket model 216, a ticket-role mapper 208 identifies for each role 221 that a user of the system may assume, what atomic components of the ticket 210 are relevant for that role 221. Relevant components (comp A, comp B, etc.) of the ticket 210 for the given role 221 are added to the ticket 210 either using markup, or stand-off annotations (in a manner consistent with the way other annotations are added to tickets—in fact, the ticket-role mapper 208 could conceivably be thought of as an additional annotator (218)). These annotations 229 are employed by the ticket rendering GUI 206 to render a view of the ticket 210 that is customized to the user's role 221. The CMDB 214 includes information about managed IT components, their hard and soft attributes, and their relationship to one another. For example, if the managed IT component were a server, sample hard attributes would be the server's IP address(es), its manufacturer, its machine type and model, etc. Sample soft attributes could include the primary system administrator, the hours of support and the business purpose of the server.

The CMDB-ticket mapper 212 identifies what elements of the CMDB 214 are relevant for what roles and adds this information as markup or stand alone annotations to the ticket 210 to assist the ticket rendering GUI 206 in its role-specific customization of the ticket view. The ticket rendering component 206 may include a graphical user interface (GUI) rendering system that incorporates all the above components to render a ticket in a way that is most appropriate for a given user and role. For example, by default much detail may be hidden behind GUI devices such as "twisties" or other expand/contract iconic graphical user interface elements. A "twisty" is an iconic arrow that points sideways when information associated with the twisty is contracted and less information shown, and points downward when expanded and more detail is shown. For some roles and experience levels, the twisties will, by default, be expanded and for others contracted. The same is true for acronyms (expanded/contracted by default) and definitions of terms/phrases. For users deemed to need just the summary information, all details of the ticket will be collapsed within a twisty, or analogous GUI device.

The attributes of the user 202 include the known or discovered role 221 of the user and can include the level of sophistication or level of experience of the user as can be discerned either by the system's explicit knowledge of this information, or by inferring the information by comparing the current ticket with the content of the user's prior work with the system. One of the possible different views may be an abstract or summary of the ticket. The abstract or summary of the ticket may be performed automatically, for example, using automatic text summarization or other methods.

Different views may be presented based on whether the user is a business user or an IT user. The different views presented incorporate auxiliary information relevant to the ticket obtained either from a repository of information about systems under management or obtained in real time from discovery agents. The different views presented incorporate knowledge of annotations done on a ticket, either by persons or by automatic software elements, and the different views presented may incorporate the relationship of the current ticket with other tickets which have been opened against components related to the current ticket.

One or more of the views presented may include a timeline incrementally showing what has been added to the ticket over its lifetime. One or more of the views presented may include a timeline showing recent changes to the operating environment relevant to the components mentioned or implicit in the ticket. The auxiliary information relevant to the ticket may come from a configuration management database (CMDB) 214, or, for example, from a directory of user data, including such information as experience level or roles the user has assumed. The views presented to the business or IT user may include information about business processes the incident, problem or change impacts and/or potentially impacted service level agreements (SLAs).

Having described preferred embodiments of a system and method for offering multiple representations of an IPC ticket (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for rendering different views of an incident, problem or change (IPC) ticket relating to an incident based on attributes of a user looking at or working with the ticket, comprising:

determining relevant information related to a user, wherein the relevant information includes a plurality of attributes of each individual user, and wherein the plurality of attributes are determined by at least information gleaned from historical system use by the user;

determining an environment related to a usage by the user, wherein determining the environment comprises gleaning, with a processor, a level of sophistication of the user determined by at least information known about the user independently of user-system interaction and a role of the user; and based upon the relevant information and the environment, generating an IPC ticket with different views where a customized view is generated for each particular user based upon the plurality of attributes of each individual user, wherein the plurality of attributes includes a length of time said each individual user has worked at a particular job.

2. The method as recited in claim 1, wherein the relevant information includes attributes of the user including a known or discovered role of the user.

3. The method as recited in claim 1, wherein the relevant information includes attributes of the user including a known or discovered task of the user.

4. The method as recited in claim 1, wherein relevant information includes attributes of the user including a level of experience of the user as can be discerned either by a system's explicit knowledge of this information, or by inferring the information by comparing the current ticket with the content of the user's prior work with the system.

5. The method as recited in claim 1, wherein one of the different views includes an abstract or summary of the ticket.

6. The method as recited in claim 5, wherein the abstract or summary of the ticket is provided automatically using automatic text summarization.

7. The method as recited in claim 1, wherein the different views are presented based on whether the environment is a business environment or an information technology environment.

8. The method as recited in claim 1, wherein the different views include auxiliary information relevant to the ticket obtained either from a repository of information about systems under management or obtained in real time from discovery agents.

9. The method as recited in claim 8, wherein the auxiliary information relevant to the ticket comes from a configuration management database (CMDB).

10. The method as recited in claim 1, wherein the different views include knowledge of annotations done on a ticket, either by persons or by automatic software elements.

11. The method as recited in claim 1, wherein the different views include a relationship of a current ticket with other tickets which have been opened against components related to the current ticket.

12. The method as recited in claim 1, wherein one or more of the different views include a timeline incrementally showing what has been added to the ticket over its lifetime.

13. The method as recited in claim 1, wherein one or more of the different views include a timeline showing recent changes to an operating environment relevant to the components associated with the ticket.

14. The method as recited in claim 1, wherein the different views include one of information about business processes and service level agreements (SLAs).

15. A non-transitory computer readable storage medium comprising a computer readable program for rendering different views of an incident, problem or change (IPC) ticket relating to an incident based on attributes of a user looking at or working with the ticket, wherein the computer readable program when executed on a computer causes the computer to perform the steps of:

determining relevant information related to a user, wherein the relevant information includes a plurality of attributes of each individual user, and wherein the plurality of attributes are determined by at least information gleaned from historical system use by the user;

determining an environment related to a usage by the user, wherein determining the environment comprises gleaning, with a processor, a level of sophistication of the user determined by at least information known about the user independently of user-system interaction and a role of the user; and based upon the relevant information and the environment, generating an IPC ticket with different views where a customized view is generated for each particular user based upon the plurality of attributes of each individual user, wherein the plurality of attributes includes a length of time said each individual user has worked at a particular job.

16. A system for rendering, with a processor, different views of an incident, problem or change (IPC) ticket relating to an incident based on attributes of a user looking at or working with the ticket, comprising:

a user modeler configured to employ at least information known about the user independently of user-system interaction or a predetermined role of the user to assess areas of expertise of a user, the user modeler configured to determine relevant information about at least one of a role of a user, experience level of the user and a task;

a component-based ticket model configured to model information views of an IPC ticket;

configuration management database (CMDB) configured to store and manage information about informational technology components including attributes, and relationships between components;

a CMDB-ticket mapper configured to identify elements of the CMDB which are relevant for roles of the user(s); and a ticket rendering component configured to generate an IPC ticket with different views where a customized view is generated for each particular user based upon the relevant information of the user modeler, the CMDB ticket-mapper in accordance with the ticket model, wherein the relevant information includes a plurality of attributes of each individual user, wherein the plurality of attributes are determined by at least information gleaned from historical system use by the user, and wherein the plurality of attributes includes a length of time said each individual user has worked at a particular job.

17. The system as recited in claim 16, wherein the relevant information includes attributes of the user including one of a known or discovered role of the user; a known or discovered task of the user; a level of sophistication or level of experience of the user as can be discerned either by a system's explicit knowledge of this information, or by inferring the information by comparing the current ticket with the content of the user's prior work with the system; and a known or discovered task of the user.

18. The system as recited in claim 16, wherein one of the different views includes an abstract or summary of the ticket and the abstract or summary of the ticket is provided automatically using automatic text summarization.

19. The system as recited in claim 16, wherein the different views are presented based on one of an environment being a business environment or an information technology environment; auxiliary information relevant to the ticket obtained either from a repository of information about systems under management or obtained in real time from discovery agents; a relationship of a current ticket with other tickets which have been opened against components related to the current ticket; and a timeline incrementally showing what has been added to the ticket over its lifetime or relevant to the components associated with the ticket.

20. The system as recited in claim 16, further comprising a ticket annotator configured to provide annotations for the ticket in accordance with the CMBD.

* * * * *